UNITED STATES PATENT OFFICE.

HEINRICH COLLOSEUS, OF BERLIN, GERMANY, ASSIGNOR, BY MESNE ASSIGNMENTS, TO COLLOSEUS CEMENT COMPANY, A CORPORATION OF NEW JERSEY.

PROCESS FOR MANUFACTURING CEMENT BY TREATING HOT LIQUID BLAST-FURNACE SLAG WITH SOLUTIONS OF ALKALINE SUBSTANCES.

No. 893,707.          Specification of Letters Patent.          Patented July 21, 1908.

Application filed May 17, 1907. Serial No. 374,245.

*To all whom it may concern:*

Be it known that I, HEINRICH COLLOSEUS, a chemist and a doctor of philosophy, a subject of the German Emperor, and a resident of 15 Spichernstrasse, in the city of Berlin, Kingdom of Prussia, and German Empire, have invented a certain new and useful Process for Manufacturing Cement by Treating Hot Liquid Blast-Furnace Slag with Solutions of Alkaline Substances, of which the following is a specification.

This invention has reference to a process for the utilization of the well-known fact of the increase of the hydraulic-cement-forming properties of blast furnace slag by the treatment thereof with alkali salts, in such a manner, that a dry product, which can be utilized directly as a cement and which possesses the valuable qualities of the true cement, is obtained by the treatment of the slag with solutions of the alkali salts or of mixtures of the same, regardless of local conditions.

The treatment of hot liquid slag with alkalies or with salts of the same, was effected heretofore by mixing the substances to be added, in a mixing device with the hot liquid slag, or by allowing the hot stream of liquid slag to run into a vessel, on the bottom of which a comparatively small quantity of the alkali salt in absolutely anhydrous condition was placed. By either of these two manners of treatment, a perfect thorough mixing of the stream of hot liquid slag and a perfect impregnation with the additions could not be obtained, inasmuch as it is impossible, to obtain an intimate and uniform mixture of the hot liquid, metal-like mass with solutions of the additions referred to by mere mixing and stirring, in view of both the specific gravities as well as the temperatures and the specific heats of the several ingredients of the mixture to be obtained being so widely different. When treating the slag with dry substances, the largest proportion of the same, on account of its ready fusibility, will soon rise to the surface of the molten mass of slag, so as to be able to be removed therefrom by skimming. Under no condition however the required thorough mixing and the intimate impregnation of the slag with the alkali salts takes place and the products obtained in this manner, were only to be utilized as primary products which required further treatment to be worked into cement and not as the final finished products, the said products as heretofore obtained requiring in most cases further additions and further treatment to be converted into cement and in order to impart the proper degree of binding quality to the same.

In British Patent 18623 of 1903 a process has been described, for treating hot liquid blast furnace slag with solutions of alkaline substances. In accordance with this process however, the hot liquid blast furnace slag is run into water which contains weak solutions of alkalies or of alkaline substances, lime water in particular, no further addition being made to the slag itself. The product obtained by working in this manner, is then dried and is then worked into cement, yielding a granular, hydrated mass, which, for the purpose of being worked into cement, has to be still submitted to a very expensive drying. In another of the processes, as practised before my invention, the slag is treated with water by sprinkling in a closed receptacle. The water vapors, formed there by interchange of heat between the slag and the water, produce a disintegrating action upon the slag. This process therefore, has reference to a merely physical change, that is to say to a disintegration of the slag without further additions.

The process forming the subject of my invention, is distinguished from the previous processes referred to, especially by the fact, that solutions of alkali salts are injected under pressure into the hot liquid blast furnace slag freshly drawn from the furnace. The thus injected solutions of alkali salts do not combine chemically with the slag, but a chemical change in the condition of the slag is brought about by the immediate vaporization of the water coming in contact with the hot liquid slag, the hot liquid slag being very rapidly chilled, whereby a perfectly anhydrous, dry product is obtained, which after being cooled down, can be ground directly into cement and be used as such, without necessitating any preliminary drying.

As an instance of carrying my invention into effect, I may mention, that in the case of blast furnace slags, containing about 45 to 50 per cent. of lime, a solution, containing 1 to 2 percent. of alkali salt is sufficient, while in the case of slags containing 40 to 45 percent. of lime it is necessary, to employ a solution of salt containing about 5 per cent.

What I claim and desire to secure by Letters Patent of the United States is:—

1. The incorporation with slag, for the purpose of forming cement, of alkali salts which are deposited therein in the solid state at the moment of the disintegration of the slag, and do not act chemically on the slag until the same is intended for use, substantially as described.

2. The incorporation with slag, for the purpose of forming cement, of alkali salts which are deposited therein in the solid state at the moment of the disintegration of the slag, so as to remain inert therein until the slag is mixed up for use, substantially as described.

3. The process of making hydraulic cement from slag, which consists in running a stream of the slag into a disintegrating apparatus, and at the same time supplying a stream of aqueous solution thereto, and commingling the slag and solution both in a disintegrated or atomized state gradually so that only the proper quantities of the slag and solution are constantly brought into contact at the same time and the action is always a continuous and complete one as long as it lasts, collecting the resulting dry mass, and grinding the same up to form the cement substantially as described.

4. The process of manufacturing cement from slag, which consists in disintegrating the slag and simultaneously injecting an alkaline salt solution into the same, in such a proportion that the water is completely evaporated while the salt is left disseminated throughout the mass, without having been chemically acted on, collecting the dry disintegrated slag as it is formed and allowing it to cool, and finally grinding it up into powder to form cement, substantially as described.

In witness whereof I have hereunto signed my name this 2nd day of May 1907, in the presence of two subscribing witnesses.

HEINRICH COLLOSEUS.

Witnesses:
WOLDEMAR HAUPT,
HENRY HASPER.